US008965575B2

(12) United States Patent
Kamiya (10) Patent No.: US 8,965,575 B2
(45) Date of Patent: Feb. 24, 2015

(54) ROBOT SIMULATOR AND METHOD OF CONTROLLING ROBOT SIMULATOR

(75) Inventor: Koji Kamiya, Anjo (JP)

(73) Assignee: Denso Wave Incorporated, Aichi-pref. (JP)

( * ) Notice: Subject to any disclaimer, the term of this patent is extended or adjusted under 35 U.S.C. 154(b) by 1521 days.

(21) Appl. No.: 12/320,568

(22) Filed: Jan. 29, 2009

(65) Prior Publication Data

US 2009/0192775 A1 Jul. 30, 2009

(30) Foreign Application Priority Data

Jan. 30, 2008 (JP) ................................ 2008-019144

(51) Int. Cl.
*B25J 9/04* (2006.01)
*G05B 19/4069* (2006.01)
*B25J 9/16* (2006.01)

(52) U.S. Cl.
CPC ...... *B25J 9/1671* (2013.01); *G05B 2219/40479* (2013.01); *Y10S 901/02* (2013.01); *Y10S 901/14* (2013.01)
USPC ........... 700/255; 700/245; 700/250; 700/264; 901/2; 901/14

(58) Field of Classification Search
CPC .......... B25J 9/0045; B25J 9/0054; B25J 9/02; B25J 9/04; B25J 9/12–9/126; B25J 9/1605; B25J 9/1664; B25J 9/1666; B25J 9/1669; B25J 9/1671; B25J 9/1682; G05B 19/4069
USPC .......... 700/245, 250, 253, 255, 264; 901/2, 3, 901/11, 14–18, 19, 50
See application file for complete search history.

(56) References Cited

U.S. PATENT DOCUMENTS

2004/0181305 A1* 9/2004 Hertinger ....................... 700/178
2005/0149231 A1* 7/2005 Pretlove et al. ................ 700/264
2005/0224479 A1* 10/2005 Watanabe et al. ........... 219/125.1

FOREIGN PATENT DOCUMENTS

JP  A-07-214485  8/1995

OTHER PUBLICATIONS

Drotning, Bill, Analysis of Robotic Reach—Reachability Analysis, Nov. 4, 2003, Sandia National Laboratories, Intelligent Systems & Robotics Center, http://robotics.sandia.gov/reachanalysis.html.*
Costa-Castelló et al., "Workspace Analysis in Multirobot Manipulation", Oct. 2002, Institut d'Organització i Control de Sistemes Industrials (IOC), International Symposium on Robotics.*

* cited by examiner

*Primary Examiner* — Spencer Patton
(74) *Attorney, Agent, or Firm* — Oliff PLC

(57) ABSTRACT

In a robot simulator, a central processing unit (CPU) determines whether or not a portion of an operable area set for each of a right-hand system and a left-hand system of a robot overlaps. If it is determined that the portion of the operable area overlaps and that an obstacle is positioned within the operable areas, the CPU color-codes and displays an image of the operable area of each of the right-hand system and the left-hand system reset in adherence to the obstacle in a display. As a result the operable areas in a periphery of the obstacle, differing for each of the right-hand system and the left-hand system, are displayed in a clearly discernable state.

8 Claims, 10 Drawing Sheets

ROBOT SIMULATOR AND METHOD OF CONTROLLING ROBOT SIMULATOR

CROSS-REFERENCE TO RELATED APPLICATION

This application is based on and claims the benefit of priority from earlier Japanese Patent Application No. 2008-019144 filed Jan. 30, 2008, the description of which is incorporated herein by reference.

BACKGROUND OF THE INVENTION

1. Field of the Invention

The present invention relates to a robot simulator and a method of controlling a robot simulator, and in particular, to a robot simulator that simulates movement of a robot having a plurality of figures and displays an image of a movable area of the robot.

2. Description of the Related Art

There has been known a conventional robot that involves two-dimensional motions consisting of linear motion and rotational motions. This kind of robot can be conceptually shown as in FIGS. 1A and 1B to 3A and 3B.

Figure 1A:
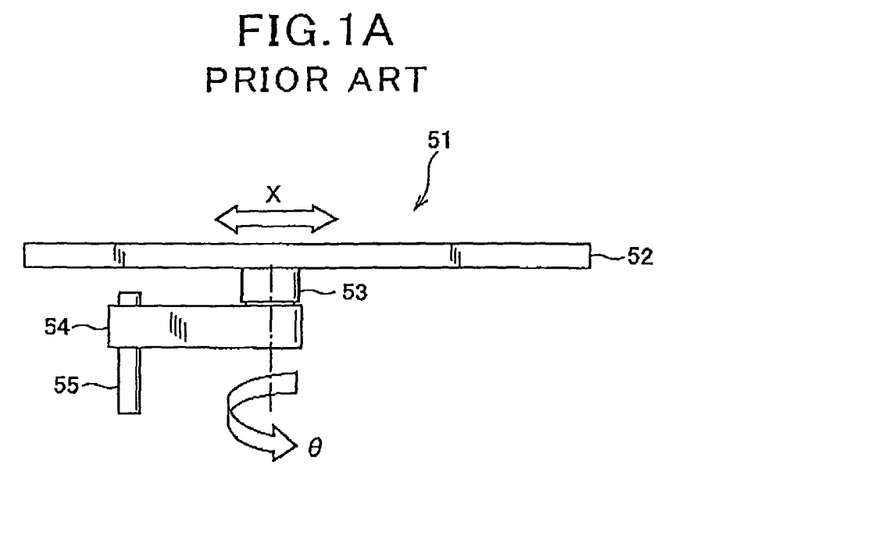
FIG. 1A is a schematic front view of a model of a configuration of a robot including an Xθ mechanism, showing a conventional technology.
Figure 1B:
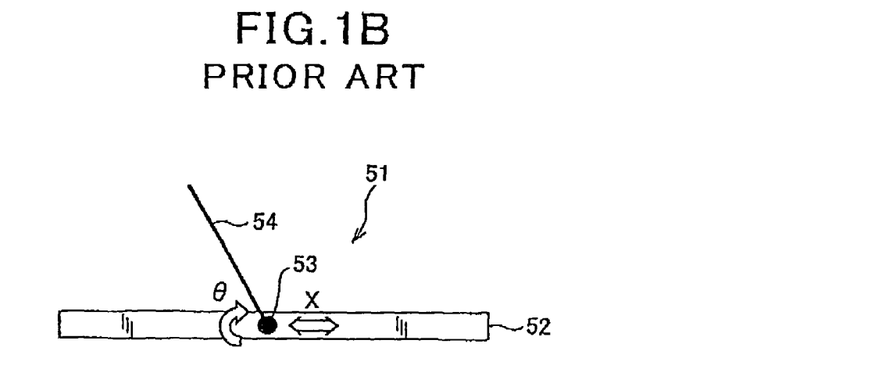
FIG. 1B is a schematic planar view of a model of a configuration of the robot including an Xθ mechanism, showing the conventional technology.

As shown in FIG. 1A and FIG. 1B, a robot 15 that has, for example, an Xθ mechanism includes a linear movement section 52, a rotation driving section 53, and an arm 54. The linear movement section 52 is configured by a linear actuator. The rotation driving section 53 is displaced in an X direction (horizontal direction in FIG. 1A and FIG. 1B) by the linear movement section 52. The rotation driving section 53 includes a base that is a center of rotation. A tip of the rotation driving section 53 is the arm 54 that moves such as to rotate in a θ direction. A tool 55 is mounted on a tip of the arm 54. The tool 55 is positioned by a base of the arm 54 being moved in the X direction and a tip end of the arm 54 being rotated in the θ direction around a Z axis.

Figure 2A:
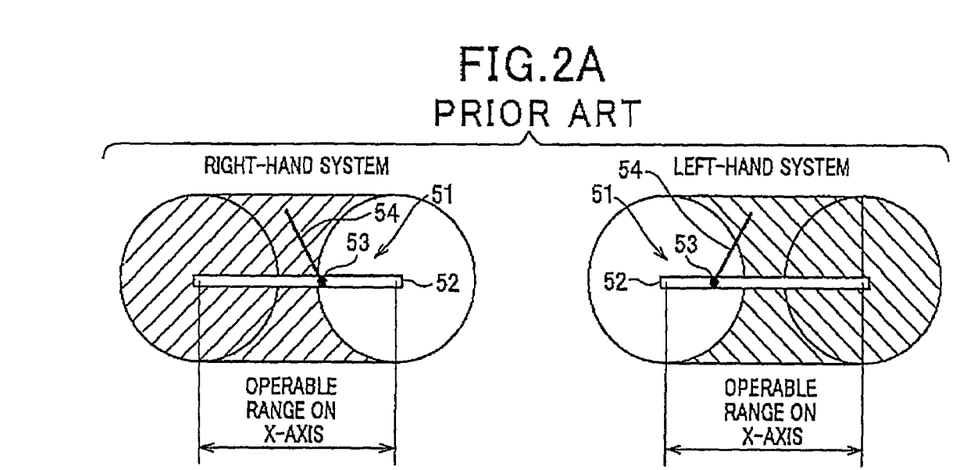
FIG. 2A is a diagram of a work area of each system of the robot.

In this case, as shown in FIG. 2A, the robot 15 is given a plurality of figures (or control figures) to be selected with respect to a position (in two dimensions) or a posture (in three dimensions) of the tool 55 selectably mounted to an end of the arm 54 at different axial positions in the X (axial) direction. In this example, the figures of the robot 15 are divided into a right-hand system and a left-hand system depending on a position (axial position) to which the base of the arm 54 moves on an X axis and a position of the end of the arm 54 relative to the base of the arm 54 in the X direction. In other words, the right-hand system is used when the end of the arm 54 is positioned to the left side with respect to the base of the arm 54 in the X direction (see FIG. 2A). The left-hand system is used when the end of the arm 54 is positioned to the right side with respect to the base of the arm 54 in the X direction (see FIG. 2A).

Figure 2B:
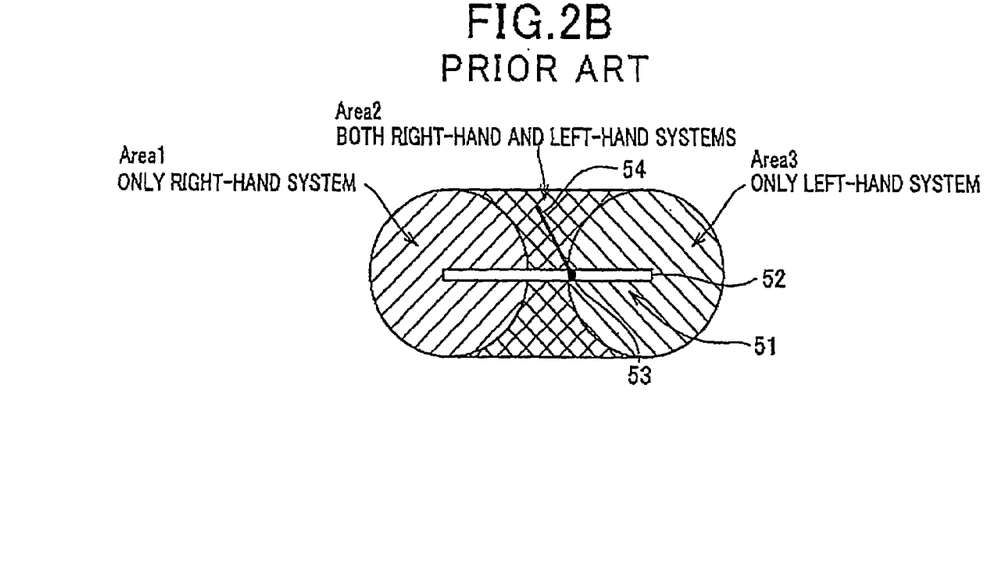
FIG. 2B is a diagram of a work area of each system of the robot.

As a result, a movable area of the robot 51 is divided into three areas: an area operable by only the right-hand system (Area 1); an area operable by only the left-hand system (Area 3); and an area operable by both the left-hand and right-hand systems (Area 2) (see FIG. 2B). Therefore, the operable area in the movable area of the robot 51 differs depending on the control configuration.

Figure 3A:
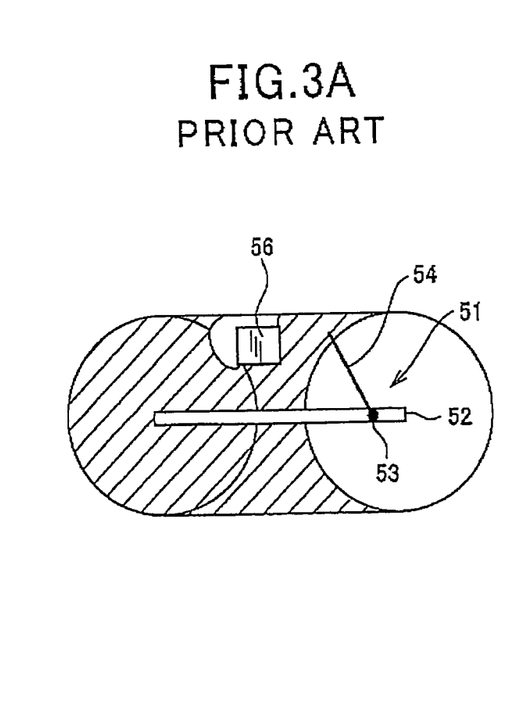
FIG. 3A is a diagram equivalent to FIG. 2A when an obstacle is present.
Figure 3B:
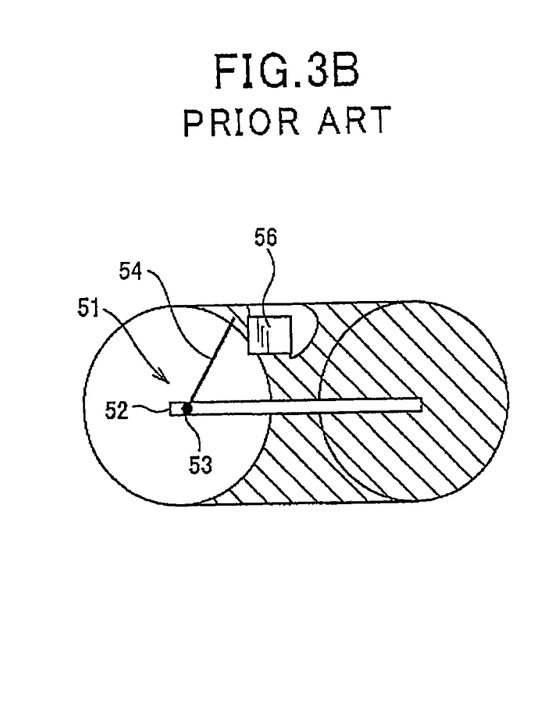
FIG. 3B is a diagram equivalent to FIG. 2A when an obstacle is disposed.

When an obstacle 56 is present, as shown in FIG. 3A and FIG. 3B, within the movable area of the robot 51 configured as described above, depending on the position, shape, and size of the obstacle 56, an area in the periphery of the obstacle 56 that is beyond the reach of the arm 54 and in which movement (operation) is not possible differs between when the figure of the robot 51 is the right-hand system (FIG. 3A) and when the figure is the left-hand system (FIG. 3B). An area in which movement is not possible by both the right-hand system and the left-hand system is also present.

As a result, distribution of the above-described inoperable areas is difficult to grasp intuitively. Therefore, if the distribution of the inoperable areas, described above, or the operable areas excluding the inoperable areas can be grasped before the robot 51 is set and actually operated, a programming operation or a teaching operation can be efficiently performed.

For example, a technology is disclosed in Japanese Patent Laid-open Publication No. 7-214485 in which the movement of the robot is simulated and displayed in a display device.

However, in the invention described in Japanese Patent Laid-open Publication No. 7-214485, the operable areas or the inoperable areas are not displayed in adherence to when the figure of the robot 51 differs. A display configuration of the invention described in this publication No. 7-214485 shows the overall robot 51 as a perspective view, and displays the movement of the robot 51 in adherence to a program in a three-dimensional manner.

Figure 8:
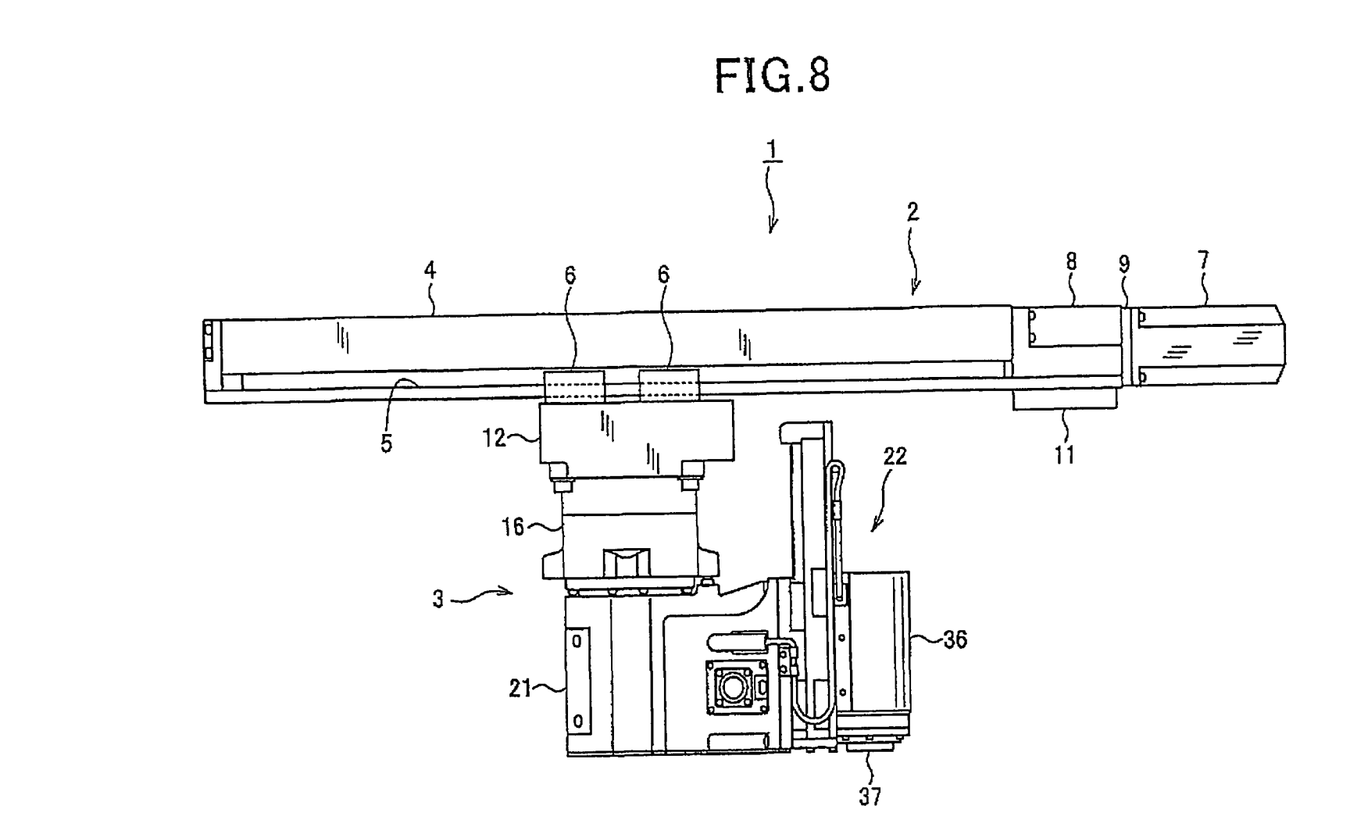
FIG. 8 is a front view of the robot in FIG. 7.

In a display configuration such as this, whether an inoperable area is present can only be determined by a result of simulated movement of a robot 1. Therefore, as shown in FIG. 8, when the operable area differs depending on the system, the distribution of the areas becomes difficult to grasp clearly. Improved efficiency of the programming operation and the teaching operation cannot be achieved.

SUMMARY OF THE INVENTION

The present invention has been achieved in light of the above-described issues. An object of the present invention is to provide a robot simulator and a robot simulator controlling method in which the robot simulator displays an image of a robot having a plurality of figures such that an operable area of each figure can be clearly comprehended.

To solve the above-described issues, in a robot simulator and a robot simulator controlling method of the present invention, when a portion of an operable area set for each figure for each of various types of tools mounted on the robot overlaps regarding two or more figures, when an obstacle is positioned within the operable areas, an image of the operable area of each figure reset in adherence to the obstacle is color-coded and displayed in a display means.

In the robot simulator and the robot simulator controlling method of the present invention, because the operable areas in a periphery of the obstacle, differing for each figure, are displayed in a clearly discernable state, which figure should be used to perform operation within which area can be easily grasped. As a result, programming operations and teaching operations can be efficiently performed by the display being referenced.

In the present invention, as another aspect to solve the above-described issues, there is also provided a method of controlling a robot simulator that simulates movement of a robot and displays a movable area of the robot in a display means, the robot i) having a plurality of driving axes each having an operable area and ii) having a plurality of figures to be selected to a position or a posture of a tool selectably mounted to an end of the arm, depending on division of the operable areas. The method comprises steps of: determining whether or not a portion of an operable area set for each of the figures for the tool mounted to the robot overlaps regarding two or more figures among the figures; color-coding and displaying, in the display means, an image of the operable area of each of the figures reset in adherence to an obstacle to be positioned within the operable area, when it is determined that the portion of the operable area overlaps regarding the two or more figures and the obstacle is positioned within the overlapping operable areas.

DETAILED DESCRIPTION OF THE PREFERRED EMBODIMENTS

Referring to FIGS. 4-10, an embodiment of the present invention will hereinafter be described.

Figure 7:
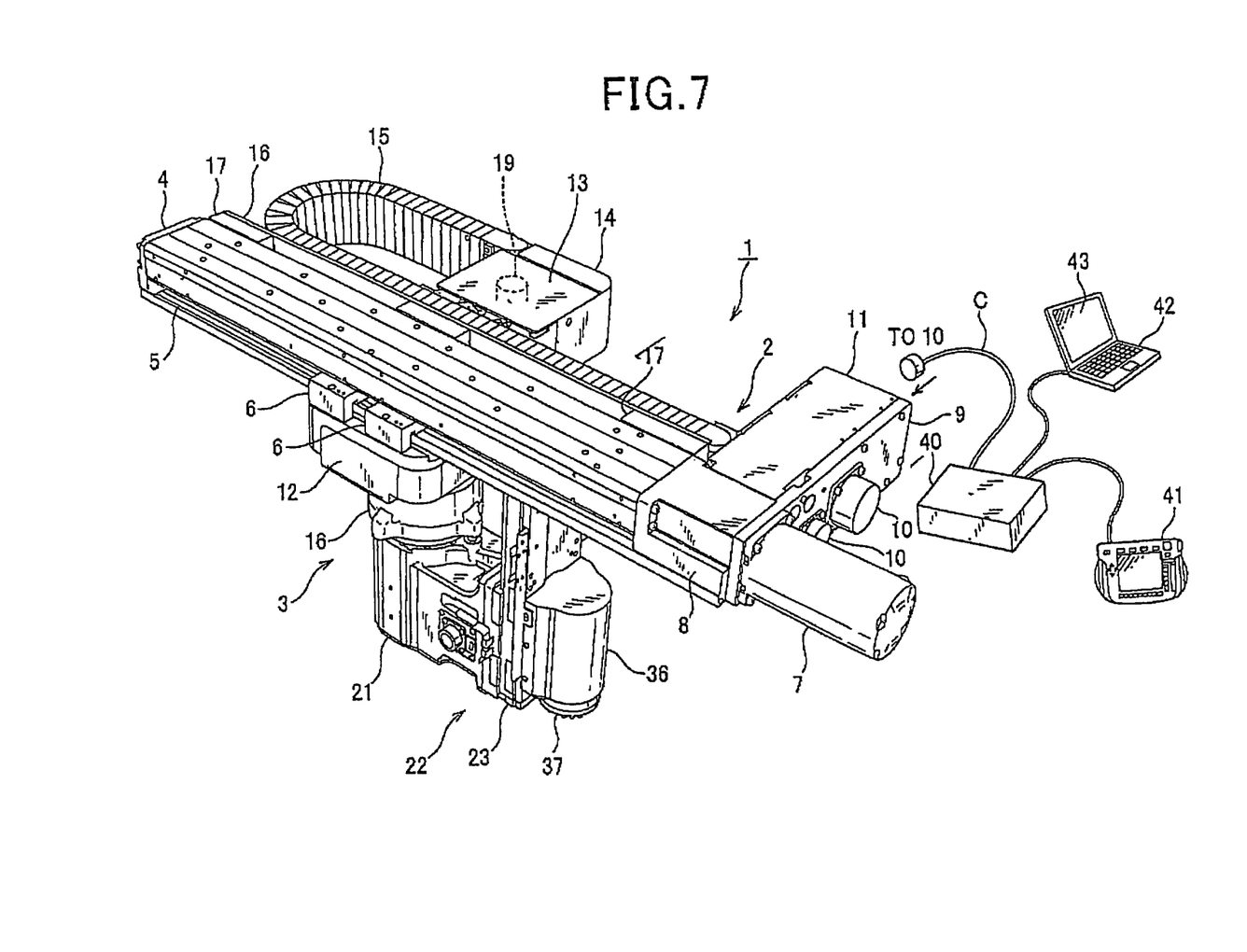
FIG. 7 is a perspective view of a robot according to the embodiment.

In the accompanying drawings, FIG. 7 to FIG. 10 show detailed configuration examples of robot 51 shown as a model in FIG. 1A and FIG. 1B. FIG. 7 is a perspective view of a robot according to the embodiment. FIG. 8 is a front view of the robot in FIG. 7. In FIG. 7 and FIG. 8, cables, pneumatic pipes, and the like are omitted.

As shown in FIG. 7 and FIG. 8, a robot 1 is generally configured such that a revolving unit (equivalent to a suspension unit) 3 is suspended from a linear motion unit 2 such as to allow linear movement. The robot 1 is set in a predetermined work area by the linear motion unit 2 being fixed horizontal to a ceiling (equivalent to a stationary region) or fixed horizontal to a leg section (equivalent to a stationary region) (not shown).

The linear motion unit 2 is configured having a linear motion axis 4 serving as a main body. A guide rail 5 is provided on the linear motion axis 4 running in a longitudinal direction. A pair of sliders 6 are mounted along the guide rail 5 such as to be allowed linear movement. The linear axis 4 includes a ball screw (not shown). The ball screw is screwed onto a nut (not shown) fixed on a slider 6. The ball screw is rotated by a linear motion axis motor 7 in a state of reduced speed by a fastening unit 8. In accompaniment with the rotation, the sliders 6 move in a linear manner along the guide rail 5.

The linear motion axis motor 7 is fixed to the fastening unit 8 by a base component 9. The base component 9 projects from the linear motion axis 4 in a horizontal direction. A box connector 10 is mounted on a side surface of the projecting portion. A box 11 is fixed to the other side surface of the base component 9 such as to be in a horizontal direction. A signal cable C, a power supply cable, and a pneumatic tube (not shown) are led into the box 11 through the box connector 10. A suspension base 12 is connected to a bottom surface of the sliders 6. The revolving unit 3 is fixed to the suspension base 12.

Figure 9:
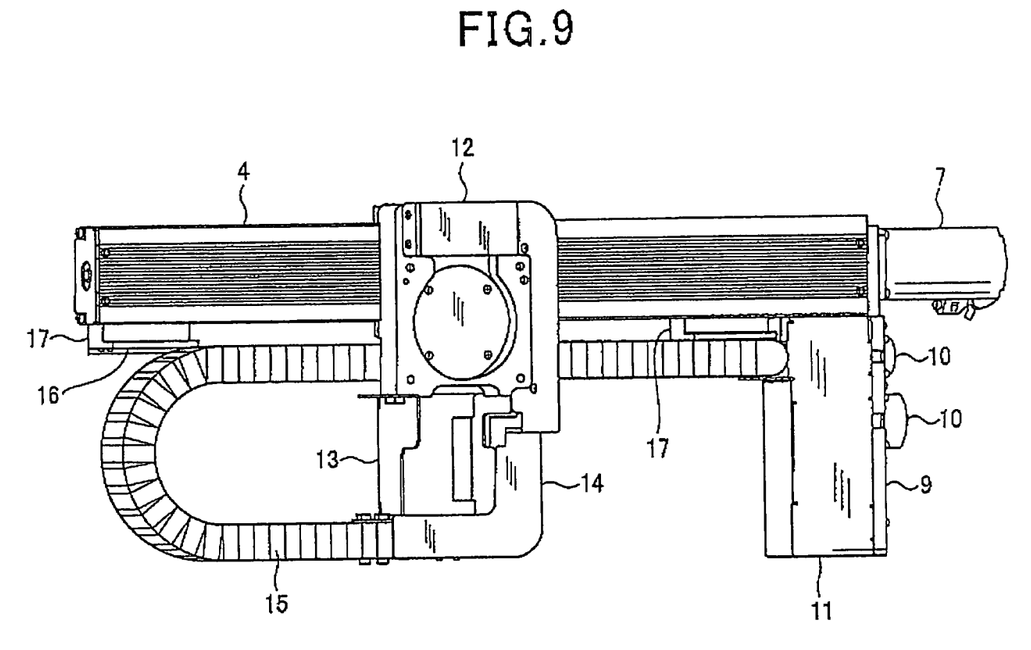
FIG. 9 is a bottom surface side perspective view of the robot from which a revolving unit in FIG. 7 has been removed.

FIG. 9 is a perspective view of a bottom surface of the robot 1 from which the revolving unit 3 has been removed. As shown in FIG. 9, the suspension base 12 is a component onto which the revolving unit 3 is fastened with a screw. A cover component 13 and an L-shaped cable duct 14 are integrally provided on a side surface of the suspension base 12.

One end of a cableveyor (registered trademark) (i.e., cable carrier) 15 is connected to the box 11 as a wiring holding tool. The cableveyor 15 is extended in a horizontal direction along the linear motion axis 4. The cableveyor 15 connects the linear motion unit 2 and the revolving unit 3 in a curved state having a curved surface. The cableveyor 15 is connected to the box 11 such that a curving direction is the horizontal direction.

A long-plate-shaped holding component 16 is fixed to a side surface of the linear motion axis 4 along the longitudinal direction via a spacer 17. The cableveyor 15 extending from the box 11 along the side surface of the linear motion axis 4 is in contact along the holding component 16. The cableveyor 15 is connected to the cable duct 14 such that an intermediate section is folded back in a curved state curving in the horizontal direction.

The linear motion unit 2 is configured as described above. The revolving unit 3 is fixed to the suspension base 12 configuring the linear motion unit 2. The cables and the pneumatic tube passing through the cableveyor 15 and the cable duct 14 are connected to the revolving unit 3. Here, the cableveyor 15 is placed such as to be lower than a topmost end of the robot 1.

Figure 10:
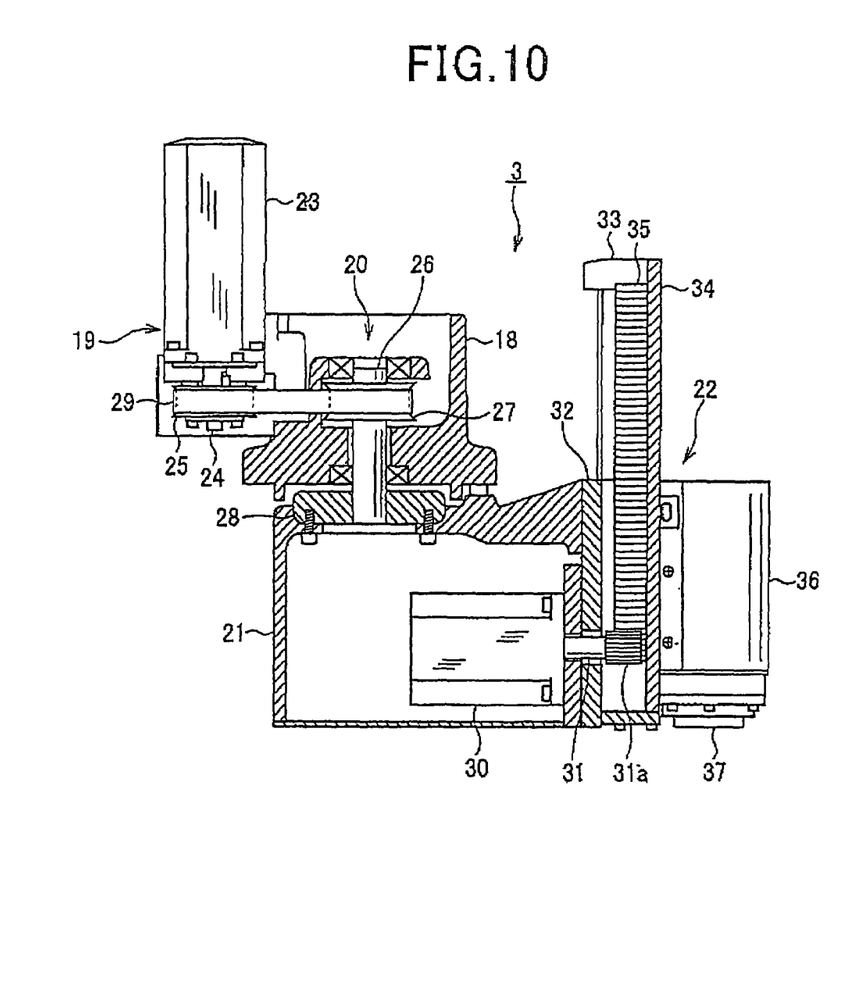
FIG. 10 is a schematic vertical cross-sectional view of a structure of the revolving unit in FIG. 7.

FIG. 10 is a schematic cross-sectional view of the revolving unit 3 in FIG. 7. As shown in FIG. 10, the revolving unit 3 includes a supporting section 18, a driving section (equivalent to a drive source) 19, a driven section 20, a revolving arm (equivalent to a movable component) 21, and an elevator section 22. The driving section 19 is provided in parallel to the side of the supporting section 18. The driven section 20 is held by the supporting section 18 such as to be allowed to rotate. The driving section 19 is configured by a driving pulley 25 being mounted on a shaft 24 of a rotation axis motor 23. The driven section 20 is configured such that a driven pulley 27 is mounted on a top end of a shaft 26 that is supported by the supporting section 18 such as to be allowed to rotate and a revolving section 28 is mounted on a bottom end of the shaft 26. The driving pulley 25 and the driven pulley 27 are connected by a timing belt 29. The rotation axis motor 23 rotates the revolving section 28. In this case, a head portion of the driving section 19 is positioned to a side of the linear motion axis 4, and the driving section 19 is stored in the cover component 13.

The revolving arm 21 is fixed to the revolving section 28 of the driven section 20. Therefore, the revolving arm 21 revolves in at horizontal direction in accompaniment with the rotation of the rotation axis motor 23. An elevator motor 30 is disposed within the revolving arm 21. A pinion gear 31a is fixed to an end of a shaft 31 of the elevator motor 30.

The elevator section 22 is mounted on a tip of the revolving arm 21. The elevator section 22 is configured such that a base component 32, a main slider 33, and a follower slider 34 are connected to one another by a so-called telescopic mechanism. A rack 35 is fixed to the follower slider 34. The pinion gear 31a of the elevator motor 30 is engaged with the rack 35.

A rotation motor 36 is mounted on the follower slider 34. The rotation motor 36 rotates a flange 37. A hand (not shown) is mounted on the flange 37. In this case, when the hand mounted on the flange 37 is operated pneumatically, air is supplied to the hand from the pneumatic tube passing within the cableveyor 15, in adherence to an operation of a pressure-feeding solenoid valve. The main slider 33 and the follower slider 34 rises and falls depending on the drive of the elevator motor 30.

A controlling device 40 controls each of the above-described motors 7, 23, 30, and 36, and the pressure-feeding solenoid valve. A teaching pendant 41 and a personal computer 42 for inputting a program are connected to the controlling device 40 as peripheral devices. The personal computer (area data reading means and display controlling means) 42 is a known, general-purpose personal computer. Although details are not shown, the personal computer 42 includes a central processing unit (CPU), a storage device (storage means), such as a read-only memory (ROM), a random access memory (RAM), and a hard disk, a communication interface, and the like.

An application program that also functions as the robot simulator of the present invention is installed in the hard disk of the personal computer 42. A display displayed during operation as a simulator is displayed in a display (displaying means) 43. However, a personal computer for inputting a program is not necessarily required for the robot simulator. For example, a device specializing in functions as a simulator can be separately configured.

Next, operations according to the embodiment will be described with reference to FIG. 4, FIG. 5A, and FIG. 5B. The present invention is characterized by the functions of the robot simulator provided by the personal computer 42. The operations thereof are more easily described if the structure is model-like. Therefore, the description is given using the robot 51 in FIG. 1A and FIG. 1B. The linear movement section 52 of the robot 51 corresponds to the linear motion unit 2 of the robot 1. The rotation driving section 53 corresponds to the revolving unit 3. The arm (rotating component) 54 corresponds to the revolving arm 21.

In the hard disk of the personal computer 42, display data (differing based on a type of tool 55 used), such as those shown in FIG. 2A and FIG. 2B, is stored in advance. The display data indicates respective operable areas of a right-hand system and a left-hand system of the robot 51.

Figure 5A:
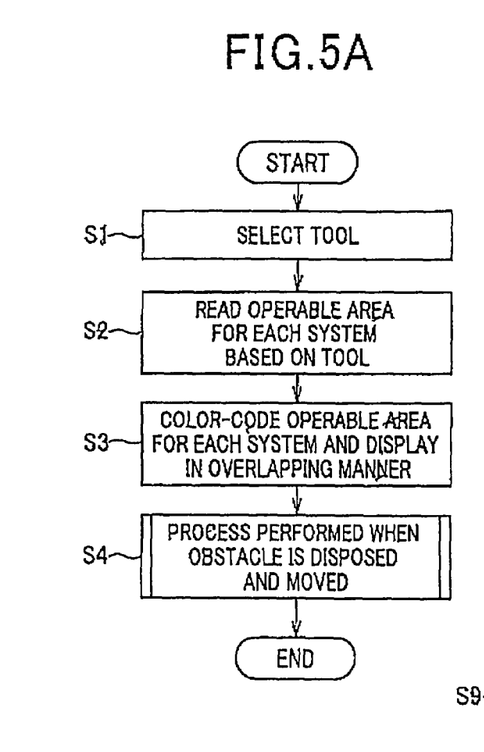
FIG. 5A is a flowchart of control operations according to the embodiment.
Figure 5B:
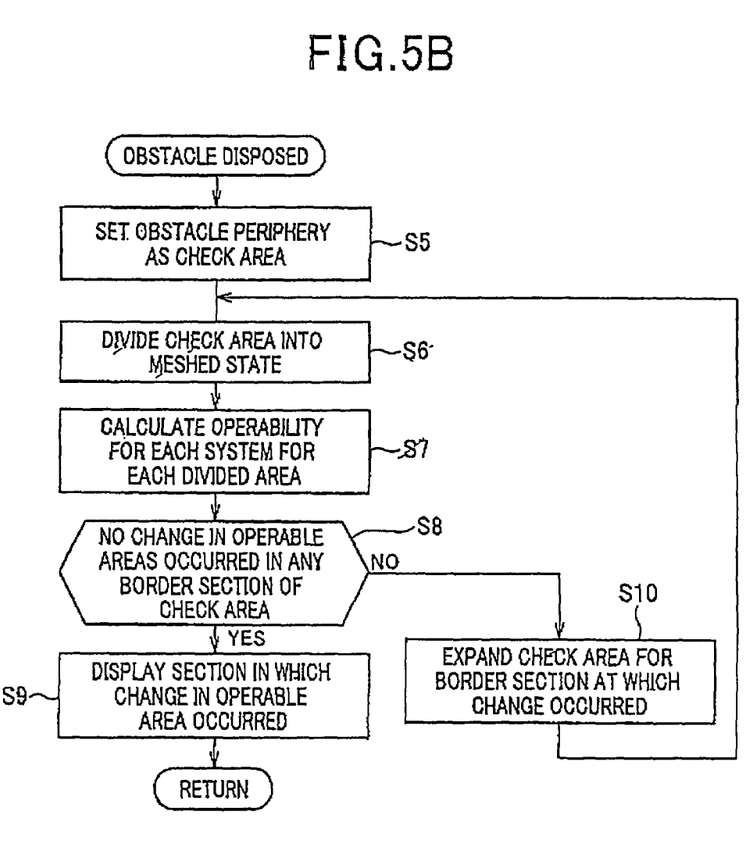
FIG. 5B is a detailed flowchart of a control operation performed in FIG. 5A, according to the embodiment.

FIG. 5A and FIG. 5B are flowcharts schematically showing control operations performed when the personal computer 42 operates as the robot simulator. In FIG. 5A, when the user selects the tool 55 to be mounted on the robot 51 (Step S1), the personal computer 42 reads data on operable areas depending on the selected type of tool 55 for each system (Step S2). Then, the personal computer 42 color-codes the operable area of each series and displays the operable areas on the display 43 in an overlapping manner. In this case, when display colors of an overlapping section of a bottom-layer image and a top-layer image differ, a color that is a combination of the display colors is displayed in the section.

For example, when color coding is performed such that the right-hand system is red and the left-hand system is blue, as shown in FIG. 2A, an Area 2 in which the operable areas of both systems overlap is displayed in purple, as shown in FIG. 2B.

Next, a display process for when an obstacle 56 is disposed within the operable area is performed (Step S4).

Figure 6:
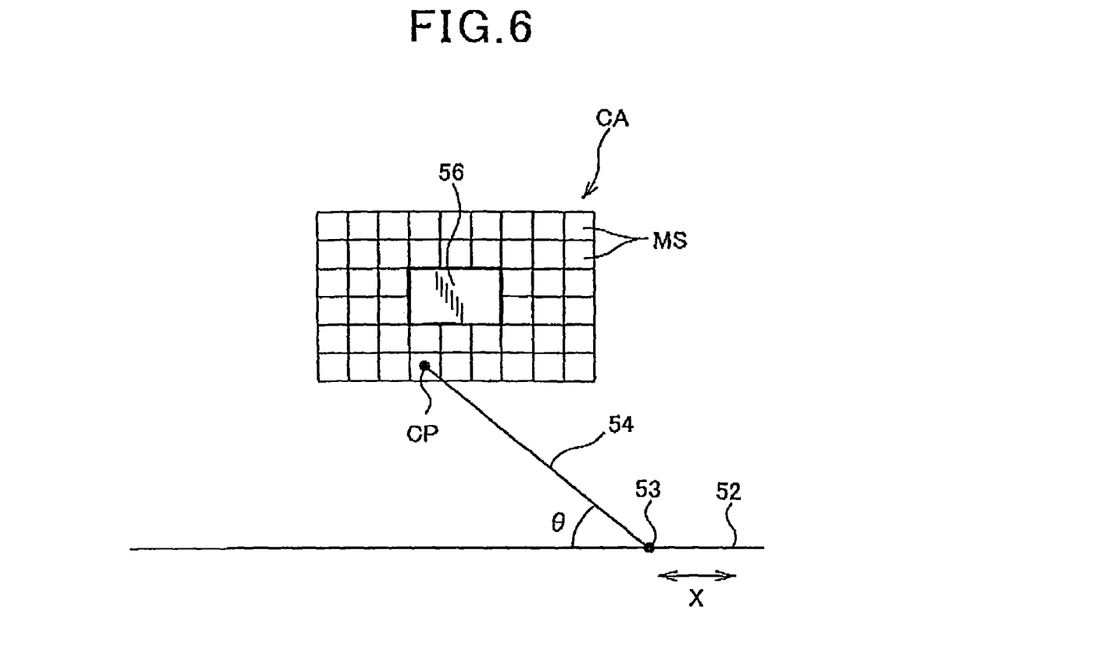
FIG. 6 shows a check area which is set to an obstacle.

FIG. 5B is a flowchart of the details of the process at Step S4. As shown in FIG. 6, when a periphery of the obstacle 56 is set as a check area CA (Step S5), and the check area CA is divided into a meshed state having a predetermined unit area (Step S6). The size and shape of the periphery is previously decided and stored in the personal computer 42 for each of various types of obstacles such that the periphery can be read or is set by hand by the user whenever the check area CA is set. The size of the meshes MS can be decided automatically by the personal computer 42 or can be decided using user's input information.

Then, whether operation can be performed by the right-hand system and by the left-hand system of the arm 54 is determined for each divided area (Step S7). This determination can be performed by setting for example a central position CP to each mesh MS and then by determining whether or not each central position CP can be reached by the right-hand and left-hand systems of the arm 54.

Next, under the condition that the obstacle 56 is moved, whether a change has occurred in the operable area at all border sections of the set check area CA is judged (Step S8). When no change has occurred (YES), a section in which the change has occurred in the default operable area read at Step S2 is displayed in the display 43 (Step S9).

On the other hand, when a change has occurred in the operable area at a portion of the border sections of the check area (NO), the change may have possibly spread outside of the border sections. Therefore, the check area is expanded for the border section at which the change in the operable area has occurred (Step S10). The process returns to Step S6. The above-described process is repeatedly performed until the YES judgment is made at Step S8.

Figure 4:
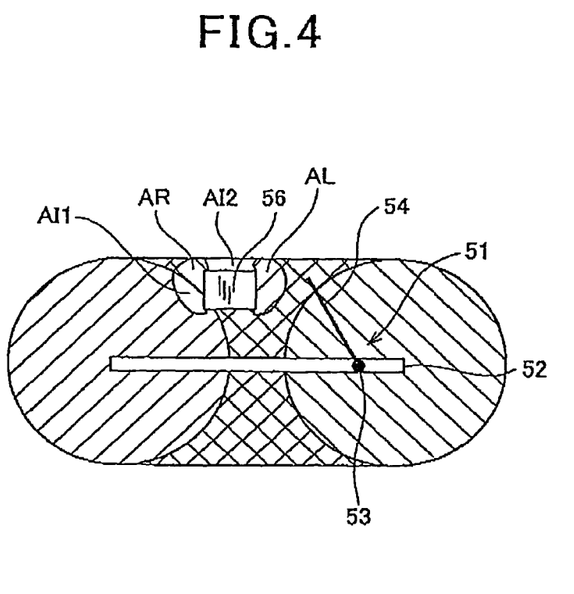
FIG. 4 is a diagram of an image displayed in a display according to an embodiment of the present invention.

FIG. 4 is an example of an image displayed in the display 43 as a result of the processes performed in FIG. 5A and FIG. 5B. The operation areas of the robot 51 on an Xθ plane are displayed two-dimensionally. Regarding the periphery of the obstacle 56, an area AL that is inoperable by only the left-hand system on a right-hand side of FIG. 4, an area AR that is inoperable by only the right-hand system on a left-hand side of FIG. 4, and an area AI1 and an area AI2 that are inoperable by both the right-hand system and the left-hand system on the left-hand side and an upper side of FIG. 4 are displayed in different colors. However, in FIG. 4, the area operable by the right-hand system is indicated by 45°-hatching (corresponding, for example, to red), the area operable by the left-hand system is indicated by 135°-hatching (corresponding, for example, to blue), the areas operable by both systems is indicated by crosshatching (corresponding, for example, to purple), and the inoperable areas are not hatched (corresponding, for example, to white).

Therefore, by referencing the display in the display 43, the user can intuitively grasp whether operation of the arm 54 should be performed by the right-hand system or the left-hand system for each section by the color-coding of each area, when the robot 51 is operated near the obstacle 56.

According to the embodiment, as described above, when a portion of the operable area set for each figure of the robot 51, the right-hand system and the left-hand system, of the robot 51 overlaps, when the obstacle 56 is positioned within the operable area, the personal computer 42 displays a color-coded image of the operable area of each system reset based on the obstacle 56. Therefore, the user can easily grasp which figure should be used to perform operation within which area. By referencing the display, the user can efficiently perform programming operations and teaching operations.

The hard disk of the personal computer 42 stores therein data in which the operable area of each system of the robot 51 when the obstacle 56 is not present is set in advance, for each unit such that different display colors are used. When the data on the operable areas set based on the selected tool is read from the hard disk for the systems of which a portion of the operable area overlaps, and positional data of the obstacle 56 disposed within the operable area is set, the operable area for each figure of the robot 51 is calculated for the periphery of the obstacle 56, and the operable areas are displayed in the display 43.

In other words, when the obstacle 56 is disposed, because an area inoperable by each system of the robot 51 is a section in the periphery of the obstacle 56, the calculation of the operable area is only required to be performed regarding the periphery of the obstacle 56. The calculating process can be simplified, and an amount of time required to display the image can be reduced.

Moreover, when the position of the obstacle 56 changes, the personal computer 42 recalculates the operable area of each system in adherence to the change in the position. An updated image is displayed in the display 43. Therefore, even when the position of the obstacle 56 changes, the operable area of each figure in adherence to the change in the position can be displayed in a short amount of time by a simple calculation process.

The personal computer 42 displays an image of the operable areas in the periphery of the obstacle 56 such as to overlap with the image of the operable area of each figure serving as a base image. In other words, the operable area is calculated for only a periphery of coordinates at which the obstacle 56 is positioned. Moreover, the areas color-coded for each figure in the periphery of the obstacle 56 obtained as a result of the calculation are merely inserted onto the operable areas serving as a base. Therefore, when the obstacle S6 is moved, processing is not troublesome because all that is required is that the operable areas in the current periphery of the obstacle 56 be deleted, the operable areas in the periphery of the obstacle 56 at a movement destination be recalculated, and an image of the calculation result be reinserted.

A processing aspect such as this is particularly suitable for a simulator used to design a robot line in which various setting variations at each factory are required to be taken into consideration.

In another aspect according to the embodiment, a storage means stores therein data in which operable areas for each figure of a robot when an obstacle is not present is set in advance for each figure such that different colors are used. Then, an area data reading means reads set data on the operable areas in adherence to a selected tool from the storage means for two or more figures of which a portion of the operable area overlaps. When positional data of the obstacle disposed within the operable area is set, a display controlling means calculates the operable area of each figure in the periphery of the obstacle and displays the operable areas in a display means.

In the above aspect, when the obstacle is disposed, the area that becomes inoperable by each figure of the robot is a section that becomes the periphery of the obstacle. Therefore, calculation of the operable area is only required to be performed regarding the periphery of the obstacle. The calculating process can be simplified, and an amount of time required to display the image can be reduced.

In another aspect according to the embodiment, when a position of the obstacle changes, the display controlling means recalculates the operable area of each figure in adherence to the position that has been changed and displays an updated image in the display means. Therefore, in the third aspect, even when the position of the obstacle is changed, the operable area of each figure in adherence to the change in the position can be displayed in a short amount of time by a simple calculation process.

In another aspect according to the embodiment, the display controlling means displays an image of the operable areas in the periphery of the obstacle such as to overlap with the image of the operable area for each figure of the robot serving as a base image. In other words, the operable area is calculated for only a periphery of coordinates at which the obstacle is positioned. Moreover, the areas color-coded for each figure in the periphery of the obstacle obtained as a result of the calculation are merely inserted onto the operable areas serving as a base. Therefore, when the obstacle is moved, processing is not troublesome because all that is required is that the operable areas in the current periphery of the obstacle be deleted, the operable areas in the periphery of the obstacle at a movement destination be recalculated, and an image of the calculation result be reinserted.

The present invention is not limited to the embodiment described above and shown in the drawings. Modifications or expansions such as those below can be made. Display colors can be changed accordingly.

The robot is not limited to that including the X$\theta$ mechanism. Therefore, the present invention can be applied to a robot, such as a horizontal polyarticular type or a vertical polyarticular type, which includes more drive axes and joint mechanisms, and allows selection of three or more figures that set different axial positions for a single position or a posture of a tool section.

What is claimed is:

1. A robot simulator that simulates movement of a robot and displays a movable area of the robot in a display,
   the robot having:
      an arm allowed to move in an axial direction of a linear motion axis and to rotate with respect to a base of the arm,
      a right-hand system that controls movement of the arm when an end of the arm is positioned to a left side with respect to the base of the arm in the axial direction,
      a left-hand system that controls movement of the arm when the end of the arm is positioned to a right side with respect to the base of the arm in the axial direction, and
      a position or a posture of a tool mounted to the end of the arm being controlled in the right-hand system and the left-hand system,
   the robot simulator comprising:
      a central processing unit (CPU) configured to:
         determine whether or not a portion of an operable area for the tool mounted to the robot that is set for the right-hand system overlaps a portion of an operable area for the tool mounted to the robot that is set for the left-hand system; and
         color-code and display, in the display, an image of the operable area of the right-hand system and an image of the operable area of the left-hand system that are reset, with regard to presence of an obstacle to be positioned within at least one of the operable areas, when it is determined (i) that the portion of the operable area of the right-hand system overlaps regarding the right hand system and the portion of the operable area of the left-hand system and (ii) that the obstacle is positioned within the overlapping portions.

2. The robot simulator according to claim 1, further comprising:
a storage device configured to store therein, tool by tool, data for each of various types of tools to be mounted to the robot, in which the operable area of each of the right-hand system and the left-hand system obtained when the obstacle is not present is set in advance for each of the right-hand system and the left-hand system such that different display colors are used, and
wherein the CPU is further configured to:
read, from the storage device, the set data on the operable areas in adherence to a selected tool one of the types of tools for which portions of the operable areas of the right-hand system and the left-hand system overlap; and
when positional data of the obstacle disposed within the operable areas is set, calculate the operable area of each of the right-hand system and the left-hand system in the periphery of the obstacle and display the calculated operable areas in the display.

3. The robot simulator according to claim 2, wherein, when a position of the obstacle changes, the CPU recalculates the operable area of each of the right-hand system and the left-hand system in adherence to the position that has been changed and displays updated images of the operable areas in the display.

4. The robot simulator according to claim 3, wherein the CPU displays images of the operable areas positioned in the periphery of the obstacle such as to overlap with images of the operable areas of the right-hand system and the left-hand system.

5. A method of controlling a robot simulator that simulates movement of a robot and displays a movable area of the robot in a display,
the robot having:
an arm allowed to move in an axial direction of a linear motion axis and to rotate with respect to a base of the arm,
a right-hand system that controls movement of the arm when an end of the arm is positioned to a left side with respect to the base of the arm in the axial direction,
a left-hand system that controls movement of the arm when the end of the arm is positioned to a right side with respect to the base of the arm in the axial direction, and
a position or a posture of a tool mounted to the end of the arm being controlled in the right-hand system and the left-hand system,
the method comprising steps of:
determining whether or not a portion of an operable area for the tool mounted to the robot that is set for the right-hand system overlaps a portion of an operable area for the tool mounted to the robot that is set for the left-hand system; and
color-coding and displaying, in the display, an image of the operable area of the right-hand system and an image of the operable area of the left-hand system that are reset, in adherence to an obstacle to be positioned within at least one of the operable areas, when it is determined (i) that the portion of the operable area of the right-hand system overlaps the portion of the operable area of the left-hand system and (ii) the obstacle is positioned within the overlapping portions.

6. The method according to claim 5, further comprising steps of:
storing data for various types of tools mounted on the robot, in which an operable area of each of the right-hand system and the left-hand system obtained when the obstacle is not present is set in advance for each of the right-hand system and the left-hand system such that different display colors are used;
reading the set data on the operable areas in adherence to a selected one of the types of tools for which portions of the operable areas of the right-hand system and the left-hand system overlap;
when positional data of an obstacle disposed within the operable areas is set, calculating the operable area of each of the right-hand system and the left-hand system in the periphery of the obstacle; and
displaying the calculated operable areas in the display.

7. The method according to claim 6, further comprising, when a position of the obstacle changes, a step of recalculating the operable area of each of the right-hand system and the left-hand system in adherence to the position that has been changed and displaying updated images of the operable areas in the display.

8. The method according to claim 7, wherein the display step displays images of operable areas in the periphery of the obstacle such as to overlap with images of the operable areas of each of the right-hand system and the left-hand system.

* * * * *